(12) United States Patent
Kim et al.

(10) Patent No.: US 8,012,548 B2
(45) Date of Patent: Sep. 6, 2011

(54) FLAT PANEL DISPLAY AND METHOD OF FABRICATING THE SAME

(75) Inventors: Jin Wuk Kim, Gyeonggi-do (KR); Chang Hee Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 175 days.

(21) Appl. No.: 11/156,531

(22) Filed: Jun. 21, 2005

(65) Prior Publication Data
US 2006/0105116 A1 May 18, 2006

(30) Foreign Application Priority Data
Nov. 16, 2004 (KR) ........................ 10-2004-0093701

(51) Int. Cl.
*G02F 1/1339* (2006.01)
(52) U.S. Cl. ........................ 428/1.5; 349/122
(58) Field of Classification Search .......... 428/1.5–1.54; 349/155, 122, 153
See application file for complete search history.

(56) References Cited

U.S. PATENT DOCUMENTS

| | | | | |
|---|---|---|---|---|
| 3,799,838 A * | 3/1974 | Murphy et al. | ............ | 428/447 |
| 3,991,002 A * | 11/1976 | Sadlo | ............ | 524/363 |
| 4,543,404 A * | 9/1985 | Sugano et al. | ............ | 528/26 |
| 4,548,989 A * | 10/1985 | Allen et al. | ............ | 525/101 |
| 4,582,726 A * | 4/1986 | Shuey et al. | ............ | 427/208.8 |
| 4,685,770 A * | 8/1987 | Baeger | ............ | 349/155 |
| 4,767,647 A * | 8/1988 | Bree | ............ | 428/14 |
| 5,091,290 A * | 2/1992 | Rolfson | ............ | 430/327 |
| 5,238,993 A * | 8/1993 | Hsieh | ............ | 524/726 |
| 5,449,731 A * | 9/1995 | Suzuki et al. | ............ | 526/322 |
| 5,812,232 A * | 9/1998 | Shiroto et al. | ............ | 349/157 |
| 5,821,289 A * | 10/1998 | Congelio et al. | ............ | 524/104 |
| 5,851,605 A * | 12/1998 | Hisamitsu et al. | ............ | 428/1.54 |
| 6,064,461 A * | 5/2000 | Nishida | ............ | 349/155 |
| 6,080,832 A * | 6/2000 | Chen et al. | ............ | 528/170 |
| 6,183,869 B1 * | 2/2001 | Okuda et al. | ............ | 428/411.1 |
| 6,312,546 B1 * | 11/2001 | Bannister et al. | ............ | 156/230 |
| 6,440,573 B1 * | 8/2002 | Hansen et al. | ............ | 428/447 |
| 6,445,076 B1 * | 9/2002 | Shimizu et al. | ............ | 257/783 |
| 6,613,439 B1 * | 9/2003 | Goebel | ............ | 428/429 |
| 6,632,872 B1 * | 10/2003 | Pellerite et al. | ............ | 524/502 |
| 6,720,042 B2 * | 4/2004 | Ylitalo et al. | ............ | 428/32.26 |
| 6,765,055 B2 * | 7/2004 | Miyata et al. | ............ | 524/588 |
| 6,773,758 B2 * | 8/2004 | Yamanaka | ............ | 427/407.1 |
| 6,784,238 B2 * | 8/2004 | Tokita | ............ | 524/504 |
| 7,070,670 B2 * | 7/2006 | Tomiyama et al. | ............ | 156/248 |
| 7,150,899 B2 * | 12/2006 | Onoyama et al. | ............ | 427/470 |
| 7,179,512 B2 * | 2/2007 | Ebisu et al. | ............ | 428/1.5 |
| 2002/0080320 A1 * | 6/2002 | Suzuki et al. | ............ | 349/153 |
| 2002/0113936 A1 * | 8/2002 | Yanagawa et al. | ............ | 349/155 |

(Continued)

FOREIGN PATENT DOCUMENTS

CA 19942131342 * 3/1995

(Continued)

*Primary Examiner* — Sophie Hon
(74) *Attorney, Agent, or Firm* — Morgan, Lewis & Bockius LLP

(57) ABSTRACT

A flat panel display and a method of fabricating a flat panel display is provided. The flat panel display includes a first plate, a second plate facing the first plate, a pattern spacer formed between the first and the second plates, and an adhesion promoter disposed overlapping the pattern spacer to improve an adhesive strength of the first and the second plates.

11 Claims, 6 Drawing Sheets

U.S. PATENT DOCUMENTS

| | | | |
|---|---|---|---|
| 2003/0002006 A1 | 1/2003 | Freeman | |
| 2003/0021961 A1* | 1/2003 | Ylitalo et al. | 428/195 |
| 2003/0117541 A1* | 6/2003 | Kim et al. | 349/43 |
| 2003/0130535 A1* | 7/2003 | Deschler et al. | 556/413 |
| 2004/0026363 A1* | 2/2004 | Akamatsu et al. | 216/13 |
| 2004/0266923 A1* | 12/2004 | Fehn et al. | 524/261 |

FOREIGN PATENT DOCUMENTS

| | | | |
|---|---|---|---|
| JP | 11130832 A | * | 5/1999 |
| JP | 2004067741 A | * | 3/2004 |
| KR | 10-2003-0093789 A | | 12/2003 |
| KR | 10-2004-0018899 | | 3/2004 |

* cited by examiner

FLAT PANEL DISPLAY AND METHOD OF FABRICATING THE SAME

This application claims the benefit of Korean Patent Application No. P2004-093701 filed in Korea on Nov. 16, 2004, which is hereby incorporated by reference.

BACKGROUND OF THE INVENTION

1. Field of the Invention

The present invention relates to a flat panel display, and more particularly, to a flat panel display and a method of fabricating the same with improved adhesive strength of an upper plate and a lower plate.

2. Description of the Related Art

Recently, various flat panel display devices have been highlighted with reduced weight and bulk to eliminate disadvantages of cathode ray tube (CRT) technology. Such flat panel display devices include liquid crystal display (LCD) devices, field emission display (FED) devices, plasma display panel (PDP) devices, an electro-luminescence (EL) displays, etc. Among these flat panel display devices, an LCD controls the light transmittance of liquid crystal cells in accordance with video signals to display a picture, which corresponds to the video signals, in a liquid crystal display panel where the liquid crystal cells are arranged in a matrix shape. In this case, a thin film transistor TFT is generally used as a switching device to independently supply the video signals to each liquid crystal cell.

FIG. 1 shows a related art liquid crystal display panel.

As shown in FIG. 1, the related art liquid crystal display panel includes an upper plate in which a black matrix 2, a color filter 6, a pattern spacer 13 and an upper alignment film 8 are sequentially formed on an upper substrate 1; a lower plate in which a thin film transistor TFT, a common electrode 4, a pixel electrode 9, and a lower alignment film 10 are formed on a lower substrate 5; and a liquid crystal material (not shown) injected into an inner space between the upper plate and the lower plate.

In the upper plate, the black matrix 2 is formed overlapping the area of the TFT on the lower substrate 5 and the areas of the gate and data lines (not shown). The black matrix 2 also partitions the cell regions at which the color filter 6 is to be formed. The black matrix 2 prevents light leakage and absorbs external light, thereby improving the contrast ratio. The color filter 6 is formed at the cell region partitioned by the black matrix 2 and is formed over the black matrix 2. The color filter 6 is formed for each of red (R), green (G), and blue (B) filters to produce red, green, and blue colors. The pattern spacer 13 maintains the cell gap between the upper substrate 1 and the lower substrate 5.

In the lower plate, the TFT includes a gate electrode 16 with a gate line (not shown) formed on the lower substrate 5; semiconductor layers 126 and 127 formed overlapping the gate electrode 16 with a gate insulating layer 129 positioned therebetween; and source/drain electrodes 128 and 130 formed with a data line (not shown) with the semiconductor layers 126 and 127 positioned therebetween. The TFT supplies pixel signals from the data line to the pixel electrode 9 in response to scan signals from the gate line. The pixel electrode 9 is made of a transparent conductive material with a high light transmittance and contacts the drain electrode 130 of the TFT with a passivation film 25 positioned therebetween. The common electrode 4 is formed in a stripe form to alternate with the pixel electrode 9. A common voltage being a reference to drive the liquid crystal material is applied to the common electrode 4. In an in-plane switching (IPS) mode liquid crystal display panel, a horizontal electric field formed by the common voltage and a pixel voltage supplied to the pixel electrode 9 makes the liquid crystal molecules rotate in a horizontal direction.

In a twisted nematic (TN) liquid crystal display panel, the common electrode is formed on the upper plate. In this case, a vertical electric field formed by the common voltage applied to the common electrode and the pixel electrode applied to the pixel electrode makes the liquid crystal material rotate in a vertical direction. An upper alignment film 8 and a lower alignment film 10 for aligning a liquid crystal material are formed by applying an alignment material such as polyimide to perform a rubbing process. Then, the complicated upper and lower substrates 1 and 5 are combined with each other such that the upper and the lower alignment films 8 and 10 directly contact each other near the area of the pattern spacer 13 of the upper substrate 1. The pattern spacer 13 of the upper substrate maintains the cell gap between the two substrates.

However, the polyimide used for the material of the upper and the lower alignment films 8 and 10 has a relatively weak adhesive strength. Accordingly, when liquid crystal material is over-injected into the space between the upper plate 40 and the lower plate 50, the upper plate 40 becomes separated from the lower plate 50, as shown in FIG. 2. As a result, the alignment of the liquid crystal material becomes scattered by the separated space. Furthermore, when the liquid crystal display panel receives an impact from an exterior, the upper plate 40 and the lower plate 50 having such weak adhesion properties are easily separated from each other.

SUMMARY OF THE INVENTION

Accordingly, the present invention is directed to a flat panel display and method of fabricating the same that substantially obviates one or more of the problems due to limitations and disadvantages of the related art.

An object of the present invention to provide a flat panel display and a method of fabricating the same capable with improved adhesive strength between an upper plate and a lower plate.

Another object of the present invention is to provide a flat panel display that is more robust and more tolerant of manufacturing variations.

Another object of the present invention is to provide a flat panel display that can be easily manufactured with a high yield.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a flat panel display comprises a first plate; a second plate facing the first plate; a pattern spacer formed between the first and the second plates; and an adhesion promoter disposed overlapping the pattern spacer to improve an adhesive strength of the first and the second plates.

In another aspect, a method of fabricating a flat panel display comprising steps of forming a first plate and a second plate, the first plate having a pattern spacer thereon; forming an adhesion promoter disposed overlapping the pattern spacer; and joining the first plate with the second plate so that the pattern spacer is disposed between the first and second plates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
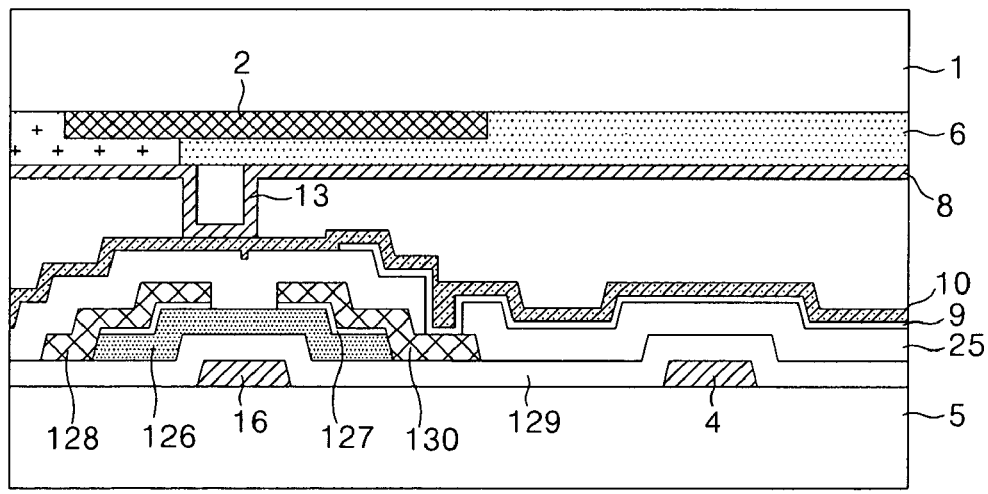
FIG. 1 is a sectional view illustrating a related art liquid crystal display panel.
Figure 2:
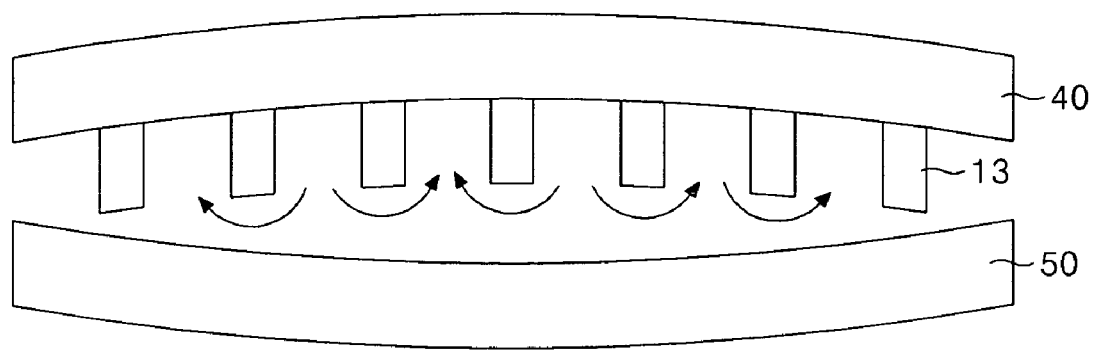
FIG. 2 is a schematic sectional view illustrating a state where liquid crystal material is over-injected into the related art liquid crystal display panel of FIG. 1.
Figure 3:
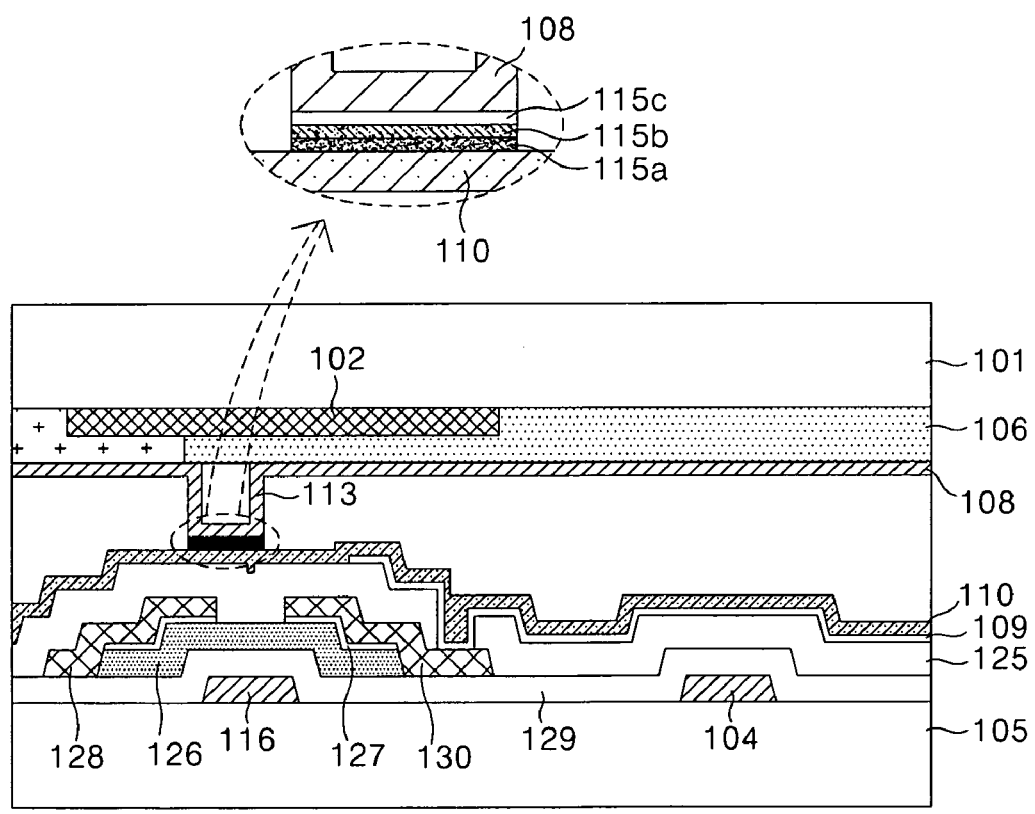
FIG. 3 is a sectional view illustrating an exemplary liquid crystal display panel according to the present invention.

Hereinafter, the preferred embodiments of the present invention will be described in detail with reference to FIGS. 3 to 4C. FIG. 3 shows a sectional view of in-plane switching (IPS) mode liquid crystal display panel according to the present invention.

Referring to FIG. 3, the IPS mode liquid crystal display panel includes an upper plate having a black matrix 102, a color filter 106, a pattern spacer 113, an upper alignment film 108 and an adhesion promoter 115 sequentially formed on an upper substrate 101; a lower plate having a thin film transistor TFT, a common electrode 104, a pixel electrode 109, and a lower alignment film 110 formed on a lower substrate 105; and a liquid crystal material (not shown) injected into an inner space between the upper plate and the lower plate.

In the upper plate, the black matrix 102 is formed overlapping the area of the TFT on the lower substrate 105 and the area (not shown) of gate and data lines. The black matrix 102 also partitions the cell regions at which the color filter 106 is to be formed. Further, the black matrix 102 prevents light leakage and absorbs external lights, thereby improving the contrast ratio. The color filter 106 is formed at the cell region partitioned by the black matrix 102 and is formed over the black matrix 102. The color filter 106 is formed with each of red (R), green (G), and blue (B) filters and represents red, green, and blue colors. The pattern spacer 113 maintains the cell gap between the upper substrate 101 and the lower substrate 105.

In the lower plate, the TFT includes a gate electrode 116 with a gate line (not shown) formed on the lower substrate 105; semiconductor layers 226 and 227 formed overlapping the gate electrode 116 with a gate insulating layer 229 positioned therebetween; and source/drain electrodes 228 and 230 formed with a data line (not shown) with the semiconductor layers 226 and 227 positioned therebetween. The TFT supplies pixel signals from the data line to the pixel electrode 109 in response to scan signals from the gate line. The pixel electrode 109 includes a transparent conductive material with a high light transmittance and contacts a drain electrode 230 of the TFT with a passivation film 125 positioned therebetween. The common electrode 104 is formed in a stripe form to alternate with the pixel electrode 109. A common voltage provides a reference voltage for driving the liquid crystal material and is applied to the common electrode 104. A horizontal electric field formed by the common voltage and a pixel voltage supplied to the pixel electrode 109 makes the liquid crystal molecules rotate on a basis of a horizontal direction.

An upper alignment film 108 and a lower alignment film 110 for aligning a liquid crystal material are formed by applying an alignment material, such as polyimide, and subjecting it to a rubbing process. Thereafter, the adhesion promoter 115 for improving an adhesive strength of the upper alignment film 108 and the lower alignment film 110 is adhered onto the upper alignment film 108 applied on the pattern spacer 113 of the upper plate. In this connection, the adhesion promoter 115 should be a material with excellent adhesive efficiency. To achieve this, the adhesion promoter 115 can be formed of a mixture of a primer 115a, an active dilute solution 115b and a carrier 115c.

To easily describe this, as shown in FIG. 3, the adhesion promoter 115 is represented by classifying the primer 115a, the active dilute solution 115b and the carrier 115c. The primer 115 adheres an adhesion surface of the upper alignment film 108 to an adhesion surface of the lower alignment film 110. In this connection, an exemplary material for the primer 115a is a Dow Corning primer having a composition range from 5 weight % to 20 weight %.

The active dilute solution 115b cleans and activates a surface being adhered by the primer 115a to make an easy adhesion. In this connection, a material of the active dilute solution 115b includes heptane, naphtha, acetone, toluene, etc. The active dilute solution 115b has a composition range from about 60 weight % to about 80 weight %.

The carrier 115c moves the adhesion promoter 115 to the other surface being adhered when an adhesion material is treated on one surface. Here, after adhering the upper alignment film 108 to the lower alignment film 110, the carrier 115c may be absorbed to the upper alignment film 108. A material for the carrier 115c includes nucleotide NMP system, in which a volatility component of the carrier 115c does not flow within cells or does not contaminate the liquid crystal material and does not evaporate easily by a spin coating. The carrier 115c has a composition range from about 10 weight % to about 20 weight %.

Exemplary materials and compositions of the adhesion promoter 115 are provided in Table 1.

TABLE 1

|  | Material | Composition (weight %) |
| --- | --- | --- |
| Primer | Dow corning primer | 5~20 |
| Active dilute solution | heptane, naphtha, acetone, toluene | 60~80 |
| carrier | NMP system | 10~20 |

The adhesion promoter 115 is used to improve an adhesive strength between the upper plate and the lower plate. Accordingly, the upper plate and the lower plate of the liquid crystal display panel are adhered to each other with a high adhesive strength. Thus, separation of the upper plate from the lower plate can be prevented when the liquid crystal material is over-injected or an external impact is applied to the liquid crystal display panel. Further, the adhesion promoter 115 according to the present invention can be used with a TN mode liquid crystal display panel. It should be further noted that the adhesion promoter 115 according to the present invention can be used with all types of flat panel displays, for example, plasma display panels, organic electro-luminescence panels, micro electro mechanical system (MEMS) display panels, etc., when joining an upper plate with a lower plate.

Figure 4A:
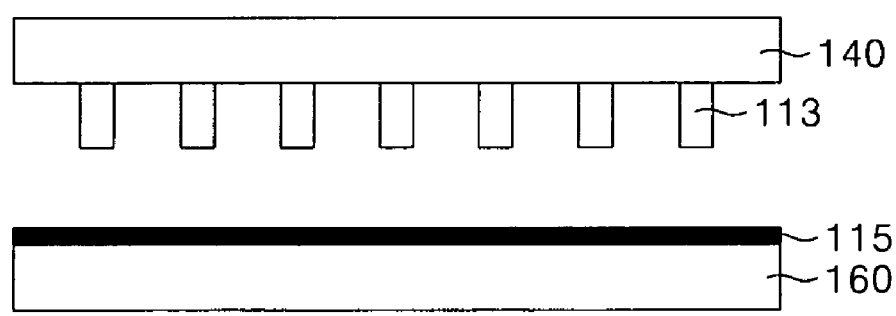
FIGS. 4A to 4C are sectional views illustrating a process where an adhesion promoter is adhered on a pattern spacer for the device of FIG. 3.
Figure 4B:
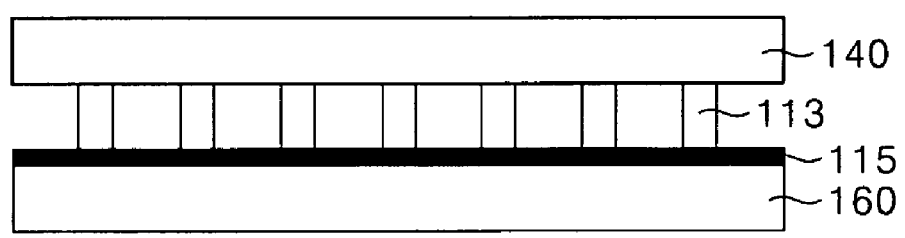
Figure 4C:
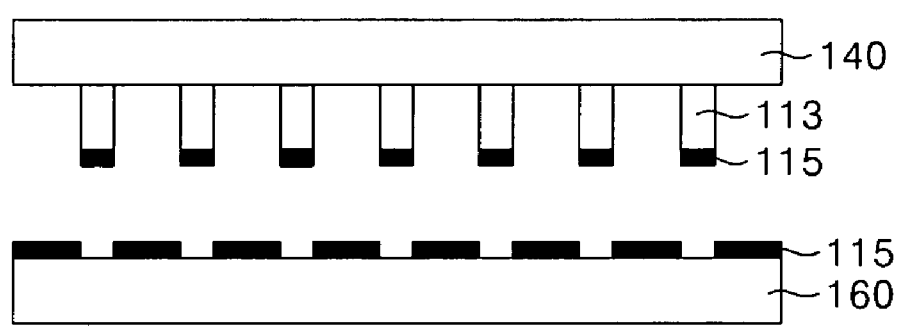

FIGS. 4A to 4C are sectional views illustrating an exemplary process in which the adhesion promoter in FIG. 3 is adhered on a pattern spacer.

Referring to FIG. 4A, a spare substrate 160, to which the adhesion promoter 115 is applied, and an upper plate 140, on which a pattern spacer 113 is formed, are aligned so that the adhesion promoter 115 and the pattern spacer 113 are facing each other. Here, the upper alignment film 108 (of FIG. 3) is already formed but not shown. Then, as shown in FIG. 4B, the spare substrate 160 is adhered to the upper plate 140 to make the adhesion promoter 115 adhered to the pattern spacer 113 of the upper plate 140.

Thereafter, when the spare substrate 160 is separated from the upper plate 140, as shown in FIG. 4C, the adhesion promoter 115 is adhered only on the contacted pattern spacer 113 and is not adhered on the upper plate 140. Here, the adhesion promoter 115 applied to the spare substrate 160 has a thickness of about 0.1 μm to about 1 μm, and, on the other hand, the pattern spacer 113 formed on the upper plate 140 has a thickness of about 3 μm to about 5 μm. Next, the liquid crystal display panel is completed by combining the upper plate 140 and the lower plate 150, in which the adhesion promoter 115 is adhered to the pattern spacer 113.

Using the above-described method, when the adhesion promoter 115 is applied to the pattern spacer 113, productivity can be improved because an additional cost for a photolithography process or a mask process for applying the adhesion promoter 115 to only the pattern spacer 113 is not required. As set forth above, when the combining process of the upper plate 140 and the lower plate 150 is performed after adhering the adhesion promoter 115 to the pattern spacer 113 formed on the upper plate 140 of the liquid crystal display panel, an adhesive strength of the upper plate 140 and the lower plate 150 can be improved. Accordingly, the upper plate 140 and the lower plate 150 of the liquid crystal display panel are adhered by a high adhesive strength. Thus, it is possible to prevent separation of the upper plate 140 from the lower plate 150 when the liquid crystal material is over-injected or an impact from the exterior is applied to the liquid crystal display panel.

The method adhering the adhesion promoter 115 to the pattern spacer 113 can be applied to all types of flat panel displays, for example, plasma display panels, an organic electro-luminescence panels, a micro electro mechanical system (MEMS) display panels, etc., adhering a specific material to a specific pattern of the substrate having a large thickness, such as the pattern spacer 113 on the substrate.

As described above, in the flat panel display and the method of fabricating the same, the adhesion promoter for improving the adhesive strength of the upper plate with the lower plate is used, thereby improving the adhesive strength between the upper plate and the lower plate. Accordingly, the upper plate and the lower plate of the flat display panel are adhered each other by a high adhesive strength bond. Thus, separation of the upper plate from the lower plate in a specific case can be prevented even when the liquid crystal material is over-injected or when the impact from the exterior is applied to the liquid crystal display panel.

Moreover, when the adhesion promoter of the present invention is applied to the pattern spacer, productivity can be improved because an additional cost for a photolithography process or a mask process for applying the adhesion promoter to only the pattern spacer 113 is not required.

Further, the adhesion promoter according to the present invention can be applied to all types of flat panel displays, for example, plasma display panels, organic electro-luminescence panels, a micro electro mechanical system (MEMS) display panels, etc., in joining the upper plate with the lower plate. Similarly, the method of adhering the adhesion promoter to the pattern spacer can be applied to all types of flat panel displays, for example, plasma display panels, organic electro-luminescence panels micro electro mechanical system (MEMS) display panels, etc., in adhering a specific material to a specific pattern of the substrate having a large thickness such as the pattern spacer on the substrate.

It will be apparent to those skilled in the art that various modifications and variations can be made in the flat panel display and method of fabricating the same of the present invention without departing from the spirit or scope of the invention. Thus, it is intended that the present invention cover the modifications and variations of this invention provided they come within the scope of the appended claims and their equivalents.

What is claimed is:

1. A flat panel display, comprising:
a first plate;
a second plate facing the first plate;
a pattern spacer formed on the first plate to be fixed on the plate for maintaining the cell gap between the first and the second plates;
a first alignment film formed of polyimide on the entire surface of the first plate including the pattern spacer;
a second alignment film formed of polyimide on the entire surface of the second plate; and
an adhesion promoter bonding a part of the first alignment film corresponding to the pattern spacer to the second alignment film to improve an adhesive strength of the first and the second plates,
wherein the adhesion promoter consists of a mixture of a primer, an active dilute solution and a carrier,
wherein the primer for adhering an adhesion surface of the first alignment film to the second alignment film, has a composition in the adhesion promoter of about 5 weight % to about 20 weight %,
wherein the active dilute solution for cleaning and activating the surface being adhered by the primer, includes heptanes, and has a composition in the adhesion promoter of about 60 weight % to about 80 weight %, and
wherein the carrier for moving the adhesion promoter from a surface of the first alignment film upon which is applied the adhesion promoter to a surface of the second alignment film being adhered, includes NMP(N-methylpyrrolidone), and has a composition range in the adhesion promoter of about 10 weight % to about 20 weight %.

2. The flat panel display according to claim 1, wherein the adhesion promoter has a thickness of about 0.1 μm to about 1 μm.

3. The flat panel display according to claim 1, wherein the pattern spacer has a thickness of about 3 μm to about 5 μm.

4. The flat panel display according to claim 1, wherein the flat panel display includes one of a liquid crystal display panel, a plasma display panel, an organic electro-luminescence panel and a micro electro mechanical system (MEMS) display panel.

5. A method of fabricating a flat panel display, comprising steps of:

forming a first plate and a second plate, the first plate having a pattern spacer to be fixed thereon;

forming the first alignment film of polyimide on the entire surface of the first plate including the pattern spacer and forming the second alignment film of polyimide on the entire surface of the second plate;

forming an adhesion promoter on a part of the first alignment film corresponding to the pattern spacer and bonding the part of the first alignment film corresponding to the pattern spacer to the second alignment film using the adhesion promoter to join the first plate with the second plate, wherein the adhesion promoter consists of a mixture of a primer, an active dilute solution and a carrier, wherein the primer for adhering an adhesion surface of the first alignment film to the second alignment film, has a composition in the adhesion promoter of about 5 weight % to about 20 weight %, wherein the active dilute solution for cleaning and activating the surface being adhered by the primer, includes heptanes, and has a composition in the adhesion promoter of about 60 weight % to about 80 weight %, and wherein the carrier for moving the adhesion promoter from a surface of the first alignment film upon which is applied the adhesion promoter to a surface of the second alignment film being adhered, includes NMP(N-methylpyrrolidone), and has a composition range in the adhesion promoter of about 10 weight % to about 20 weight %.

6. The method according to claim 5, wherein the step of forming the adhesion promoter on the first alignment film applied on the pattern spacer includes: applying adhesion promoter material on a substrate; and contacting the first plate having the pattern spacer with the substrate having the adhesion promoter material so that the pattern spacer faces the adhesion promoter.

7. The method according to claim 6, wherein the adhesion promoter is applied to the substrate with a thickness of about 0.1 µm to about 1 µm.

8. The method according to claim 6 wherein the pattern spacer has a thickness of about 3 µm to about 5 µm.

9. The method according to claim 5, wherein the first plate includes a first substrate and a first alignment film formed thereon, and wherein the second plate includes a second substrate and a second alignment film formed thereon, the first and the second alignment films being adhered to each other with the adhesion promoter therebetween.

10. The method according to claim 9, wherein the adhesion promoter is disposed between the first alignment film and pattern spacer.

11. The method according to claim 5, wherein the flat panel display includes one of a liquid crystal display panel, a plasma display panel, an organic electro-luminescence panel and a micro electro mechanical system (MEMS) display panel.

* * * * *